Oct. 13, 1959 C. E. LOMAX 2,908,757

PREPAY PAY STATION

Filed Jan. 17, 1957 2 Sheets-Sheet 1

INVENTOR.
CLARENCE E. LOMAX
BY C. R. Sipe
ATTY.

Oct. 13, 1959 C. E. LOMAX 2,908,757

PREPAY PAY STATION

Filed Jan. 17, 1957 2 Sheets-Sheet 2

INVENTOR.
CLARENCE E. LOMAX

BY C. R. Sipe

ATTY.

United States Patent Office 2,908,757

Patented Oct. 13, 1959

2,908,757

PREPAY PAY STATION

Clarence E. Lomax, Chicago, Ill., assignor to General Telephone Laboratories, Incorporated, Chicago, Ill., a corporation of Delaware Application January 17, 1957, Serial No. 634,664

3 Claims. (Cl. 179—6.3)

This invention relates in general to telephone pay stations and, in particular, to prepay telephone pay stations commonly known as the reverse battery type.

More specifically, the invention relates to an improved pay station circuit arrangement and mechanism, wherein a quarter, dime, or two nickels must be deposited by the calling party before the pay station dial will be rendered effective, and wherein the deposited coins will be collected when the called party answers.

In telephone systems wherein postpay telephone pay stations of the reverse battery type are used, there is frequent criticism because of the length of time it takes the calling party to deposit a coin after the call is answered. The called party gets no immediate response to his answer, and often hangs up at about the same time that the calling party deposits the coin, the deposited coin being collected and thereby lost to the calling party. The delay time is longer, and the problem further aggravated, when the calling party deposits two nickels.

Accordingly, the primary object of my invention is to provide a simple, economical and improved prepay pay station circuit, of the reverse battery type, whereby talking connections between a calling pay station and a called party are established in an efficient, reliable, and satisfactory manner.

A further object of this invention is to provide an improved pay station wherein the initial coin deposit must be made before dialing, the deposit being collected in response to battery reversal on the pay station line, or refunded by the manual operation of a refund key.

One feature of the invention is the provision of a magnet shunted by a rectifier in the dial pulsing circuit of the pay station, the shunt path being effective until battery reversal occurs, and the magnet being effective to collect the coins after battery reversal occurs.

Another feature of the invention is the provision of another magnet that is bridged across the line whenever coins are collected, and which is thereafter effective to restore the pay station circuit and mechanism to normal when the calling party hangs up.

Other objects and features of the invention will become evident upon an examination of the following description, taken in conjunction with the accompanying drawings, in which.

Figure 1:
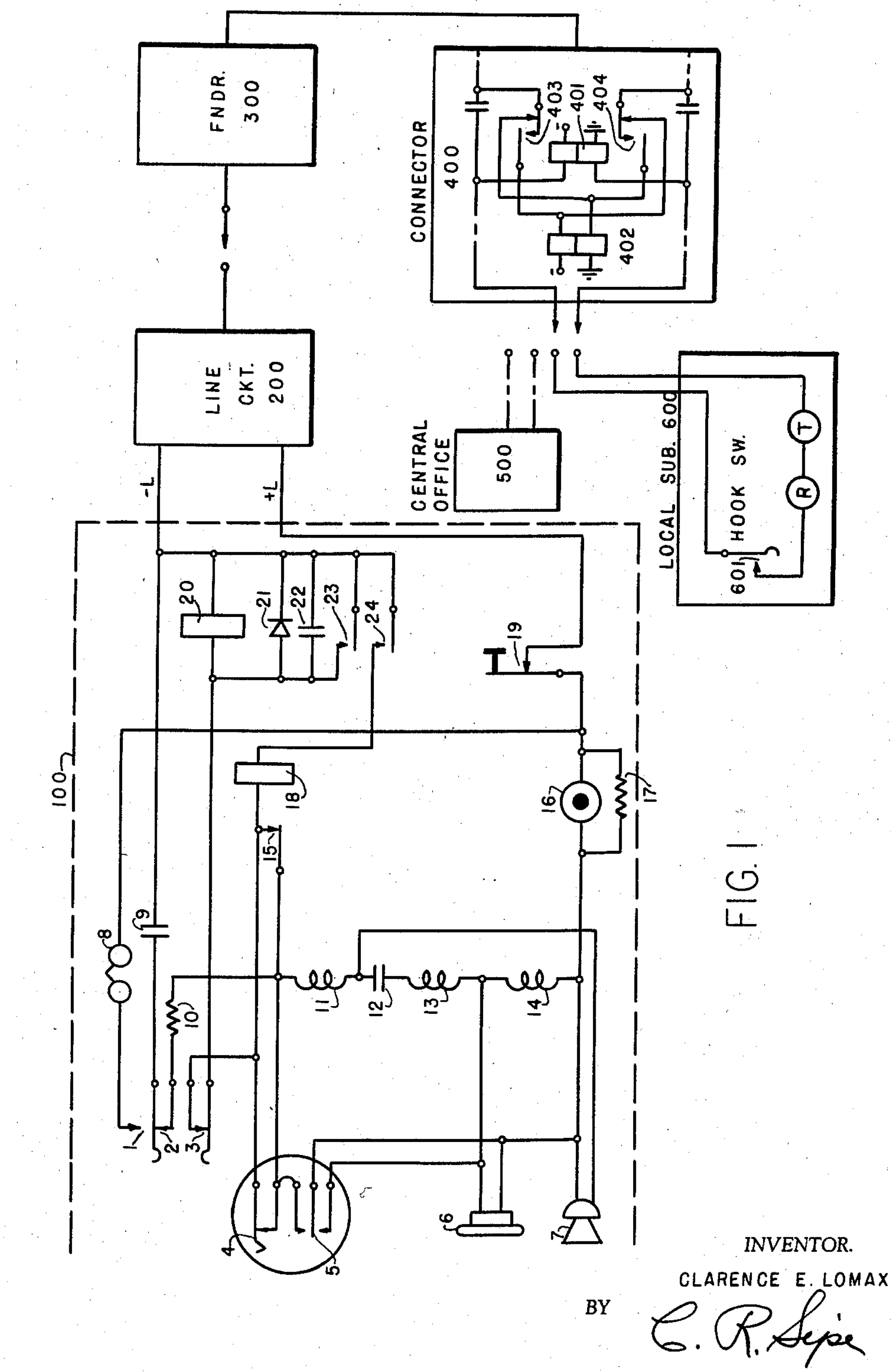
Fig. 1 shows a schematic circuit diagram of the pay station, together with simplified block diagrams of the various telephone circuits that are operated during the completion of a call.

In my invention, a substation circuit of the well-known type (including ringer 8, capacitor 9, hookswitch contacts 1, 2 and 3, dial pulsing-springs 4 and shunt-springs 5, resistor 10, induction coil windings 11, 13 and 14, capacitor 12, receiver 6, and transmitter 9) is combined with various other components in a prepay pay station. The general operation of this pay station makes it necessary for coins to be deposited before dialling, with a talking connection being thereafter established in the well-known manner by means including the dial. When the called party answers, the well-known battery reversal causes the deposited coins to be collected and a talking connection to be established. When the calling party restores his handset, the pay station circuit and mechanism is restored to normal.

*Detailed description*

When a call is initiated at pay station 100, the telephone handset is removed from the cradle thereby closing hookswitch contacts 2 and 3, as shown in Fig. 1. A circuit is thereby completed from line +L, through contact 19 of the refund key, coin transmitter 16 and resistor 17, transmitter 7, induction coil 11, coin spring contact 15 and pulse spring contact 4 in parallel, hookswitch contact 3, and rectifier 21 to line —L. Line circuit 200 and line finder 300 are thereby seized in the well-known manner.

The calling party must now deposit the required coin or coins. The deposit must be made before dialling, since pulsing springs 4 are shunted by coin springs 15, and the deposit must be made in order to open springs 15 and render the pulsing springs effective.

Figure 2:
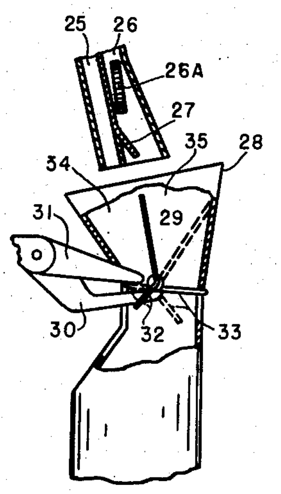
Fig. 2 shows a side elevation of a coin operated device that may be used to open the coin springs when a dime, a quarter, or two nickels are deposited at the pay station.

The deposited coins fall through coin hopper 28 (Fig. 2), and into the coin trap (not shown). Let us assume that the basic rate for initiating a call is 10 cents, or more, and that the calling party deposits two nickels. The first nickel such as nickel 26*a*, is deposited in the well-known coin guage (not shown), passes through the well-known sizing and testing devices (not shown), falls through coin chute 26, and is deflected by curved member 27 into area 35 of hopper 28. Gate 29, which has a finger 33 and an arm 32 formed integrally therewith, pivots on pin 36. The normal position of this gate assembly is shown in solid lines, and the operated position in dotted lines. When nickel 26*a* falls into the hopper, it strikes finger 33 before falling into the coin trap, thereby operating the gate assembly to the dotter line position. When the second nickel is deposited, it falls against the left hand side of gate 29, and strikes coin trigger 30 before falling into the coin trap. Thus, it will be noted that the first nickel does not strike coin trigger 30, but merely positions gate 29 so that the second nickel will strike trigger 30. If the deposited coin had been a dime or a quarter, the coin would have fallen through coin chute 25, into area 34 of hopper 28, and would have operated coin trigger 30 before falling into the trap. Gate 29 is returned from its operated to its normal position by the downward movement of arm 31, arm 31 being arranged to contact arm 32 of the gate assembly. Arm 31 is operatively connected to relays 18 and 20, and to the refund key, and is caused to move downward and thereby normalize the gate assembly whenever either relay or the key is operated.

When coin trigger 30 is operated, coin springs 15 are opened and locked open by a mechanical linkage associated therewith (not shown). Pay station 100 is thereby conditioned to send dial pulses to connector 400 in the well-known manner.

Let us now assume that the calling party dials the digits corresponding to local substation 600, that connector 400 has seized substation 600, and that the connector sends ringing current to the telephone at substation 600, all in the well-known manner. When the called subscriber answers the call, by picking up his handset, hookswitch contact 601 completes an obvious circuit for operating relay 401. When relay 401 operates, contacts 403 and 404 cause a battery reversal on the calling line in the well-known manner. Thus, lead —L of pay station 100 becomes connected to positive battery, through relay 402, and lead +L becomes connected to negative battery.

When this battery reversal occurs, rectifier 21 no longer acts as a shunt for relay 20, and relay 20 operates over the loop including contacts 3, 4, and 19, and transmitters 7 and 16, described above.

Figure 3:
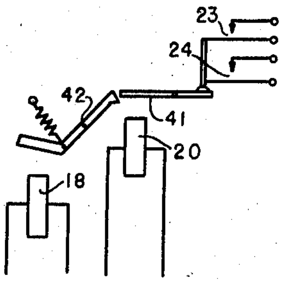
Fig. 3 is a schematic representation showing how the contacts of one relay may be locked in an operated position, and how the other relay may unlock the arrangement in order for the contacts to restore.

When relay 20 operates, armature 41 causes contacts 23 and 24 to close, as shown in Fig. 3. These contacts are held operated by the hook on lever 42, which engages the left edge of armature 41. Thus, although contact 23 completes a shunt path around relay 20, causing relay 20 to be deenergized, the contacts of relay 20 are held operated. Contact 24 completes a circuit including relay 18, but the shunt path including contacts 23 and 3 prevents relay 18 from operating at this time.

Relay 20 is operatively connected to the coin collecting mechanism, and operation of relay 20 causes coins in the coin trap to be collected in the well-known manner. Relay 20 remains operated throughout the conversation period and therefore, any coins deposited subsequent to the initial period, such as coins for overtime, automatically fall past the coin trap and are collected.

The connection has now been completed, and the parties may proceed with their conversation. When the call has been completed, the called party may restore his handset first, before the calling party does so, thereby opening contact 601. This causes relay 401 to restore, and the battery polarity on the pay station line is restored to normal. This change of polarity has no effect on the paystation at this time.

When the calling party restores his handset, contact 3 is opened to remove the shunt from relay 18, and relay 18 operates over an obvious circuit including contacts 24 and 4. The resistance of relay 18 is such that the other switches in the switch train, such as 200, 300 and 400, are held operated over the loop circuit through relay 18. Since relay 18 is not polarized, it operates regardless of the battery polarity on leads —L and +L, and it is therefore immaterial whether or not the calling party hangs up first. When relay 18 operates, the hook on lever 42 is disengaged from armature 41 (Fig. 3), and contacts 23 and 24 are thereby opened. A similar mechanical linkage (not shown), is also operated by relay 18 to restore coin springs 15. Since contact 24 opens the circuit to relay 18, relay 18 restores, and the pay station circuit is thereby restored to normal. The loop circuit being opened at contact 24 causes switches 200, 300 and 400 to be restored.

It should be noted here that if a call is made to a non pay line such as the operator's line at central office 500, there would be no battery reversal and relay 20 would not operate to collect the deposited coins. Therefore, these coins could be refunded by a manual operation of the refund key subsequent to the termination of the call. In such a case, the talking circuit would include capacitor 22.

The refund key shown schematically on Fig. 1, together with contact 19, is preferably of the type shown by Hans Sengebusch in U.S. Patent No. 2,735,891 issued February 21, 1956. A mechanical linkage (not shown) associated with this key is operative when the key is depressed, to restore coin spring contact 15 if this contact is open when the key is depressed. Thus, if the key is depressed after depositing the coins but before dialling, the coins are refunded and the contact 15 is closed to shunt dial pulse springs 4. If the key is depressed during the period when the telephone at the called substation is receiving ringing current, the coins are refunded and the switches 200, 300 and 400 are released as a result of the loop circuit being opened at the paystation. The release of these switches is assured by the time delay feature described in the above mentioned patent, whereby contact 19 is prevented from closing immediately after the refund key is released. If the refund key is depressed subsequent to operation of relay 20, the call will be terminated due to the release of the intervening switches, but the coins will have been collected and cannot be refunded.

It should also be noted that momentary operation of the pay station hookswitch during the time when the parties are conversing, will not terminate the call. Relay 18 will operate when contact 3 is opened, providing relay 20 has been previously operated by a reversal of battery as described above, causing contacts 23 and 24 to open. However, the immediate closing of contact 3 before the other switches release will reoperate relay 20 as described above.

What has been described is considered to be the preferred embodiment of my invention, but it should be understood that modifications may be made in the structure and organization of my invention without departing from the spirit thereof as defined in the appended claims.

What I claim is:

1. In a telephone system, a calling pay station, a called substation, a telephone dial at said pay station, normally shunted pulse springs operatively connected to said dial, means in said pay station operated by deposited coins for removing said shunt, a first line terminating at said pay station, a second line terminating at said substation, a first relay at said pay station, means at said pay station including said first relay for collecting said deposited coins, a rectifier connected in shunt with said first relay; a first circuit at said substation including said shunted first relay, said first line, and said pulse springs; means including said circuit responsive to the operation of said dial and resultant operation of said pulse springs subsequent to the operation of said shunt removing means for extending a calling connection from said first line to said second line, said rectifier being effective to prevent the operation of said first relay during said extending of said calling connection, means operated responsive to the answering of said connection at said called substation for applying reverse battery to said first line to thereby operate said first relay to collect said coins, a second relay at said pay station, a second circuit at said pay station including said second relay and said first line, a shunt circuit for said second relay at said pay station, means responsive to said operation of said first relay for simultaneously completing said second circuit and said shunt circuit, means at said pay station responsive to termination of the call for opening said shunt circuit and thereby causing said second relay to operate over said second circuit; and means controlled by said operation of said second relay for opening said second circuit to release said connection, and said second relay.

2. In a telephone system: a pay station; a telephone line terminating at said pay station; a telephone dial at said pay station; normally shunted pulsing springs operatively connected to said dial; means in said pay station operated by a deposited dime, quarter, or second nickel for removing said normal shunt; a rectifier in said pay station; a hook-switch contact in said pay station operated upon initiation of a call thereat; a first circuit including said line, said rectifier, said hook-switch contact and said pulsing springs for transmitting dial pulses from said pay station when said dial is operated subsequent to the operation of said shunt removing means; a first relay in said pay station; a second circuit in said pay station including said first relay and said hook-switch contact; means for operating said relay over said second circuit; means for collecting said deposited coins operated responsive to the operation of said first relay, said first relay being operated responsive to a battery reversal on said telephone line; means for shunting said first relay operated responsive to the operation of said first relay to thereby deenergize said first relay; a second relay in said pay station; a third circuit in said pay station including said line and said second relay; means for completing said third circuit operated responsive to operation of said first relay, said second relay being prevented from operating over said completed third circuit by said shunting means; locking means in said pay station effective upon operation of said first relay to mechanically lock said shunting means, said completing means, and said collecting means operated; and means operatively connected to said second relay for releasing said locking means, said second relay being operated over said second circuit when said shunting means is disconnected therefrom by the opening of said hook-switch contact upon the termination of said call at said pay station, whereupon said releasing means is operated to restore said pay station to normal.

3. In a telephone pay station for use in a telephone connection between said pay station and a called substation; a collect magnet in said pay station; a first circuit for operating said collect magnet; a first contact means operated responsive to said operation of said collect magnet for shunting said collect magnet and causing its restoration; a second contact means operated responsive to said operation of said collect magnet; a second magnet; a second circuit, including said second magnet and said second contact means, connected in parallel with said first contact means, said parallel connection being effective to prevent the operation of said second magnet; a locking means for holding said first contact means and said second contact means operated; means operatively connected with said second magnet for releasing said locking means; and means operated responsive to termination of said call at said pay station for opening said parallel connection and thereby causing said second magnet to operate over said second circuit, whereupon said locking means, said first contact means, and said second contact means are restored to normal, restoration of said second contact means being effective to open said second circuit and cause the restoration of said second magnet.

References Cited in the file of this patent

UNITED STATES PATENTS

| | | |
|---|---|---|
| 2,248,575 | Lomax | July 8, 1941 |
| 2,735,891 | Sengebusch | Feb. 21, 1956 |
| 2,750,447 | Lomax | June 12, 1956 |